UNITED STATES PATENT OFFICE.

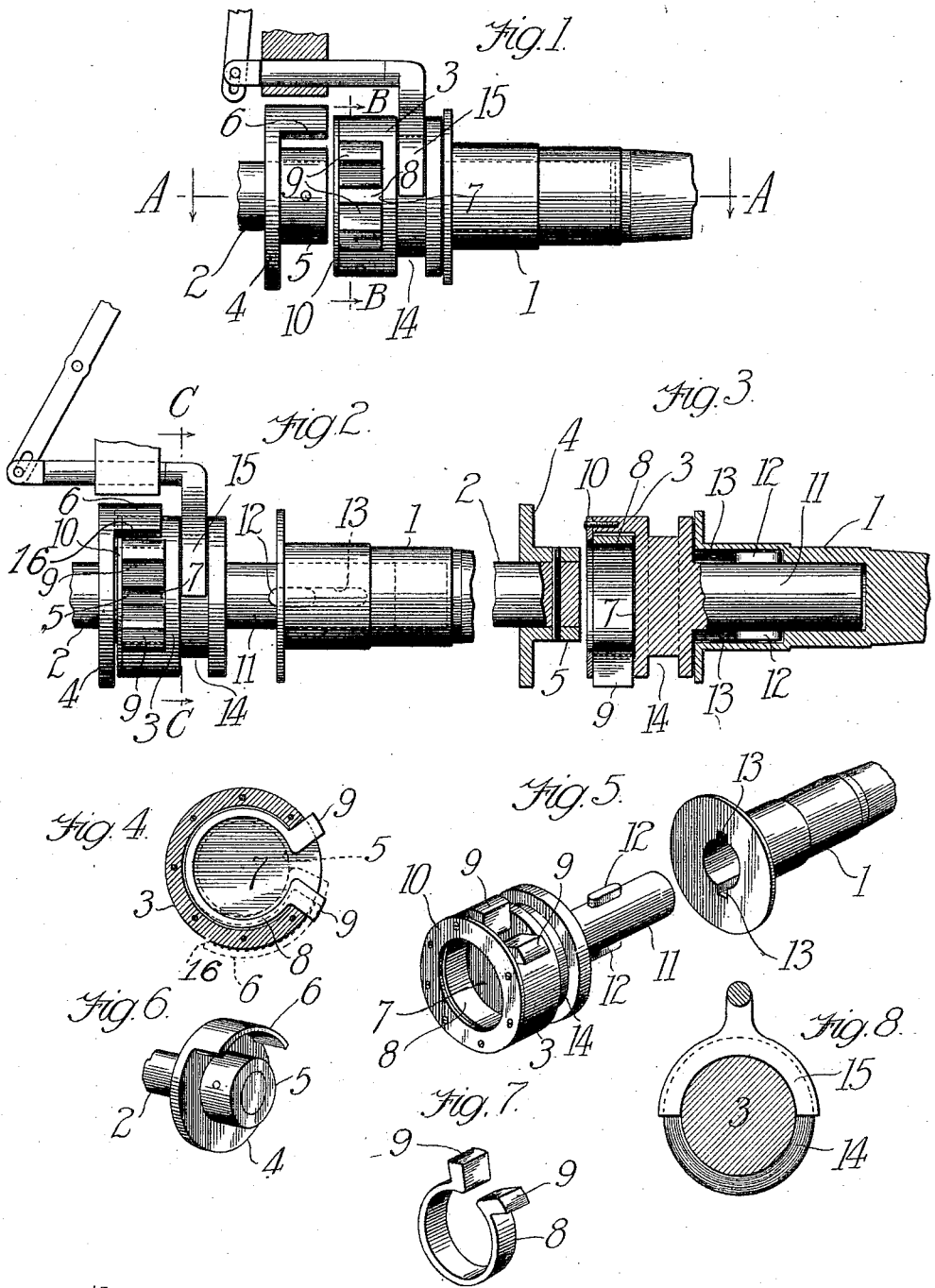

JOHN E. BECKMAN, OF CHICAGO, ILLINOIS.

CLUTCH.

985,723.　　　Specification of Letters Patent.　　Patented Feb. 28, 1911.

Application filed August 24, 1910.　Serial No. 578,700.

*To all whom it may concern:*

Be it known that I, JOHN E. BECKMAN, a citizen of the United States of America, and a resident of Chicago, county of Cook, State of Illinois, have invented certain new and useful Improvements in Clutches, of which the following is a specification.

The main objects of this invention are to provide an improved form of clutch particularly adapted for operation when one of the parts connected is driven at high speed; and to provide improved means for absorbing shocks due to sudden application of the load, and at the same time providing a positive driving connection between the driving and driven elements.

A specific embodiment of this invention is illustrated in the accompanying drawings, in which:—

Figure 1 is an elevation showing the clutch open. Fig. 2 is a similar elevation, showing the clutch closed. Fig. 3 is a longitudinal section taken on the line A—A of Fig. 1. Fig. 4 is a transverse sectional detail, taken on the line B—B of Fig. 1. Figs. 5 and 6 are perspective views of the two clutch members. Fig. 7 is a perspective view of the shock absorbing spring. Fig. 8 is a sectional detail, taken on the line C—C of Fig. 2.

In the construction shown in the drawings, the driving element 1 is journaled in axial alinement with the driven element 2, and clutch members 3 and 4 are provided for connecting and disconnecting them. The member 4 is fixed on the shaft 2, and is provided with a central cylindrical part or hub 5, and a lug 6, spaced radially away from the part 5. The clutch member 3 is splined to the shaft 1, and is provided with a central socket 7 in its end, axially alined with the part 5 of the clutch member 4, but of considerably larger internal diameter. A spring 8 of annular form is seated in the socket 7, and is of such external diameter as to fit within the walls of the socket 7. The spring 8, as shown, may be in the form of a ring split in an axial direction at one side, and is provided with integral outwardly extending lugs 9 at each side of the split, the member 3 having an aperture in its side, through which said lugs 9 extend. The lug 6 on the member 4 is so located with respect to the axis as to lie outside of the member 3 and in position to engage the projecting lugs 9 when the clutch members are in their engaged position. The ring 8 is so formed that the lugs 9 may be forced together until the inner surface of the ring will be tightly wrapped around and securely grip the part 5. The angular width of the lug 6 should be greater than the space between the lugs 9, thus preventing the possibility of the lug 6 entering between the lugs 9 when the clutch members are brought into engagement. The ring 8 is loosely seated within the socket 7, and is retained by means of a retaining ring 10, which is screwed to the end of the clutch member 3.

In the specific construction shown, the member 3 has a shank 11 which has telescoping engagement with a socket in the driving element 1, and a feather 12 slidingly engages a keyway 13. The member 3 has an annular groove 14 in its periphery for engaging the fork 15 of the clutch operating mechanism.

The operation of the device shown is as follows:—When the member 3 is shifted into engagement with the member 4, one of the ends or shoulders 16 of the lug 6 will bear against one of the shoulders 9 on the ring 8, through the rotation of the driven member. This pressure, acting through the ring 8, will cause the other shoulder 9 to bear against the shoulder 17, which is at one side of the aperture in the clutch member 3, and the first shock will be absorbed by the yielding contraction of the ring 8. As the ring 8 is of substantially uniform transverse section at all points between the lugs 9, the first effect of the strain upon it will be to cause it to bend until the parts of its inner surface near each of the lugs 9 engages with the periphery of the part 5, as is illustrated by dotted lines in Fig. 4, and further yielding of the ring will be resisted both by its strength as a spring and by its frictional contact with the part 5. In this case, the ring 8 offers a gradually increasing resistance, until it is finally wrapped tightly around the part 5, when it will form a positive unyielding connection between the members 3 and 4. It will be seen from the drawings that the structure is such that the clutch will operate with equal effect for rotation in both directions.

Although but one specific embodiment of this invention is herein shown and described, it will be understood that numerous details of the construction shown may be altered or omitted without departing from the spirit of this invention, as defined by the following claims.

I claim:—

1. The combination of a pair of clutch members, relatively movable axially into and out of engagement with each other, one of said members having therein a central socket and having thereon a pair of angularly spaced shoulders, a spring seated in said socket and having at opposite ends projecting shoulders adapted to respectively engage the shoulders on said one member, and the other said member having thereon a cylindrical part adapted to enter said socket and a shoulder spaced away from said cylindrical part and adapted to engage one of the shoulders on said spring when said members are in their engaged position, said spring being adapted, through engagement with the shoulders on the clutch members, to yieldingly resist relative rotation of said members, and to be limited in such yielding through engagement with said cylindrical part.

2. The combination of a pair of clutch members relatively movable axially into and out of engagement with each other, one of said members having therein a central socket, and the other member having a part adapted to extend loosely into said socket, a spring ring seated in said socket, and coacting shoulders on said members and ring adapted to force said ring into gripping engagement with said part through the relative rotation of said members.

3. The combination of a pair of clutch members relatively movable axially into and out of engagement with each other, one of said members having therein a central socket, and the other member having a part adapted to extend loosely into said socket, a spring ring seated in said socket and adapted to surround said part when said members are in their engaged position, and coacting shoulders on said members and ring adapted to force said ring into gripping engagement with said part through the relative rotation of said members.

4. The combination of a pair of clutch members relatively movable axially into and out of engagement with each other, one of said members having therein a central socket, and an aperture extending transversely through one side, a split ring seated in said socket and having thereon lugs located at each side of the split and extending outwardly through said aperture, and the other member having thereon a central part adapted to extend into said ring when said members are engaged, and having a shoulder radially spaced away from said part, being located to engage one of the lugs on said ring and adapted to coact with the shoulders at each side of said aperture for contracting said ring until it becomes tightly wrapped around said part to form a positive driving connection between said members.

5. The combination of a pair of clutch members relatively movable axially into and out of engagement with each other, one of said members having therein a central socket, and an aperture extending transversely through one side, a split ring seated in said socket and having thereon lugs located at each side of the split and extending outwardly through said aperture, and the other member having thereon a central part adapted to extend into said ring when said members are engaged, and having a shoulder radially spaced away from said part, being located to engage one of the lugs on said ring and adapted to coact with the shoulders at each side of said aperture for contracting said ring until it becomes tightly wrapped around said part to form a positive driving connection between said members, said shoulder having an angular width greater than the space between the lugs on said ring.

6. The combination of a pair of clutch members relatively movable axially into and out of engagement with each other, one of said members having therein a central socket, and an aperture extending transversely through one side, a split ring seated in said socket and having thereon lugs located at each side of the split and extending outwardly through said aperture, and the other member having thereon a central part adapted to extend into said ring when said members are engaged and having a shoulder radially spaced away from said part, being located to engage one of the lugs on said ring and adapted to coact with the shoulders at each side of said aperture for contracting said ring until it becomes tightly wrapped around said part to form a positive driving connection between said members, and means for retaining said ring within said socket when the members are disengaged.

Signed at Chicago this 20th day of August 1910.

JOHN E. BECKMAN.

Witnesses:
  EUGENE A. RUMMLER,
  EDWIN PHELPS.